(12) United States Patent
Lu (10) Patent No.: US 8,694,804 B2
(45) Date of Patent: Apr. 8, 2014

(54) COMPUTER SYSTEM AND POWER MANAGEMENT METHOD THEREOF

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 549 days.

(21) Appl. No.: 12/982,837

(22) Filed: Dec. 30, 2010

(65) Prior Publication Data

US 2012/0124406 A1    May 17, 2012

(30) Foreign Application Priority Data

Nov. 11, 2010   (TW) .............................. 99138888 A (51) Int. Cl.
*G06F 1/28*   (2006.01)
*G06F 1/32*   (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | | |
|---|---|---|---|---|
| 7,395,445 | B1 * | 7/2008 | Ramsay et al. ................ | 713/340 |
| 2006/0247871 | A1 * | 11/2006 | Emori et al. .................... | 702/57 |
| 2010/0299544 | A1 * | 11/2010 | Hansalia ........................ | 713/320 |
| 2010/0318826 | A1 * | 12/2010 | Hansen et al. ................. | 713/323 |

* cited by examiner

*Primary Examiner* — M Elamin
(74) *Attorney, Agent, or Firm* — CKC & Partners Co., Ltd.

(57) ABSTRACT

A power management method of a computer system is provided. The method includes the following steps. Health states of a plurality of power supplies are detected to generate a detection signal. Output powers provided by the power supplies are received to calculate a total maximum output power of the power supplies. An interrupt is generated by triggering a configuration management program according to the total maximum output power or the detection signal. The interrupt is processed by an interrupt handler to adjust a power consumption of a central processing unit (CPU).

12 Claims, 2 Drawing Sheets

COMPUTER SYSTEM AND POWER MANAGEMENT METHOD THEREOF

CROSS-REFERENCE TO RELATED APPLICATION

This application claims the priority benefit of Taiwan application serial no. 99138888, filed on Nov. 11, 2010. The entirety of the above-mentioned patent application is hereby incorporated by reference herein and made a part of this specification.

BACKGROUND OF THE INVENTION

1. Field of the Invention

The present invention generally relates to a power management method, in particular, to a computer system and a power management method thereof.

2. Description of Related Art

Generally, a plurality of power supplies is configured in some computer system, to provide the computer system with enough electric power for normal working, in which some of the power supplies serve as backup power. However, in the case that the power supply fails or is damaged (that is, the power supply cannot provide power for the computer system), the power consumption of the computer system may exceed the maximum power that can be provided by the rest of the power supplies. At this time, the computer system actuates the power throttling feature to reduce the power consumption of its internal elements (for example, to reduce the working frequency of the central processing unit (CPU) of the computer system), to maintain the normal working.

Currently, the power throttling feature is only set through hardware by a user, that is, the performance (P) and the throttling (T) status (the working frequency and duty cycle) of the CPU are adjusted to reduce the working frequency of the CPU, so as to lower the power consumption of the computer system. However, the above adjustment may result in that the current working frequency of the CPU is not optimal, and more power of the power supply is wasted.

Therefore, the computer system cannot dynamically adjust with the actual situation (that is, fails to provide a mechanism of detecting whether the total maximum output power provided by the power supply is sufficient or not), such that when the power provided by the power supply is sufficient, the actuation of the power throttling feature may cause the performance of the computer device to be further deteriorated.

SUMMARY OF THE INVENTION

Accordingly, the present invention is directed to a computer system and a power management method thereof, so that when at least one of the power supplies fails or is damaged, the computer system can still work safely with the optimal performance.

The present invention provides a power management method of a computer system, which includes the following steps. Health states of a plurality of power supplies are detected to generate a detection signal. Output powers provided by the power supplies are received to calculate a total maximum output power of the power supplies. An interrupt is generated by a configuration management program according to the total maximum output power or the detection signal. The interrupt is processed by an interrupt handler to adjust a power consumption of a central processing unit (CPU).

In an embodiment of the present invention, the adjustment of the power consumption of the CPU includes adjusting a working frequency, a duty cycle, and a number of threads of the CPU.

In an embodiment of the present invention, the adjustment of the power consumption of the CPU is performed in a table look-up manner.

In an embodiment of the present invention, after the step of calculating the total maximum output power of the power supplies, the method further includes the following steps. It is determined whether the total maximum output power is lower than a current total power consumption of the computer system. If yes, the power supplies are turned off. If not, the step of generating the interrupt by the configuration management program according to the total maximum output power is performed.

In an embodiment of the present invention, the step of detecting the health states of the plurality of power supplies includes the following sub-steps. When it is detected that at least one of the power supplies is in an unhealthy state, the power consumption of the CPU is adjusted to a preset value. When it is detected that the power supplies are all in a healthy state, the power consumption of the CPU is not adjusted.

In an embodiment of the present invention, the interrupt is a system management interrupt (SMI), and the interrupt handler is an SMI handler.

In an embodiment of the present invention, the configuration management program is an advanced configuration and power interface (ACPI) program.

The present invention further provides a computer system, which includes a central processing unit (CPU), a plurality of power supplies, a detection module, a baseboard management controller (BMC), and a south-bridge chip. The power supplies are used for providing a plurality of output powers. The detection module is coupled to the power supplies, and used for detecting health states of the power supplies, to generate a detection signal. The BMC is coupled to the power supplies, and used for receiving the output powers, to calculate a total maximum output power of the power supplies. The BMC is coupled to the power supplies through a system management bus (SMBus) or a power management bus (PM-Bus). The south-bridge chip is coupled to the detection module and the BMC, and used for receiving the detection signal or the total maximum output power and accordingly triggering a configuration management program to generate an interrupt, so that the interrupt is processed by an interrupt handler to adjust a power consumption of the CPU.

In an embodiment of the present invention, when detecting that at least one of the power supplies is in an unhealthy state, the detection module enables the detection signal, and thus the south-bridge chip adjusts the power consumption of the CPU to a preset value, and triggers the configuration management program to generate the interrupt, so that the interrupt is processed by the interrupt handler to adjust the power consumption of the CPU; while when detecting that the power supplies are all in a healthy state, the detection module disables the detection signal, and thus the power consumption of the CPU is not adjusted.

In another embodiment of the present invention, when calculating the total maximum output power, the BMC compares the total maximum output power with a preset total maximum output power, and when the total maximum output power is not equal to the preset total maximum output power, the BMC updates the preset total maximum output power to the total maximum output power, and transmits a signal of the total maximum output power to the south-bridge chip to trigger the configuration management program to generate the interrupt, so that the interrupt is processed by the interrupt handler to adjust the power consumption of the CPU.

According to the present invention, the health states of the power supplies are detected, and the output powers provided by the power supplies are received to acquire the total maximum output power of the power supplies capable of providing power. Next, the interrupt is generated by triggering the configuration management program according to the health states or the total maximum output power of the power supplies. The interrupt is then processed by the interrupt handler to adjust the power consumption of the CPU. In this manner, through the present invention, when at least one of the power supplies fails or is damaged, the computer system can still work safely with the optimal performance. Moreover, the present invention is also capable of predicting the output powers of the power supplies (that is, to predict the changes of the output powers of the power supplies), to accordingly adjust the power consumption of the CPU.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
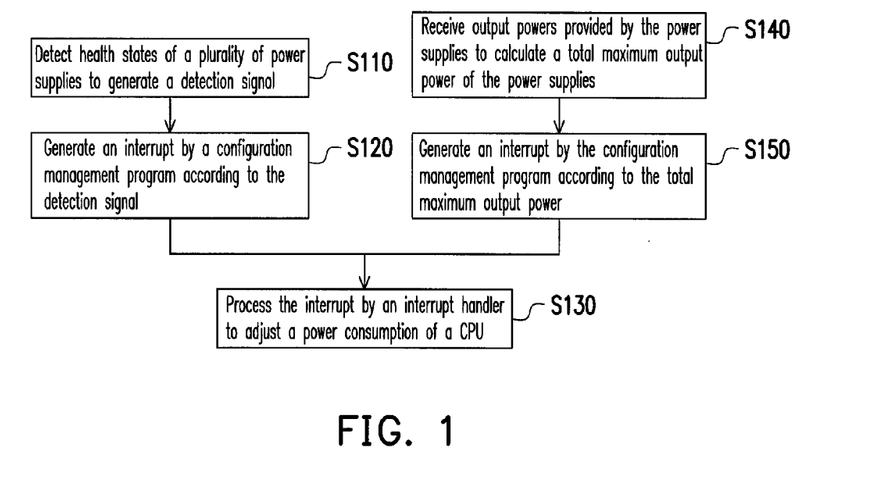
FIG. 1 is a flow chart of a power management method of a computer system according to an embodiment of the present invention.
Figure 2:
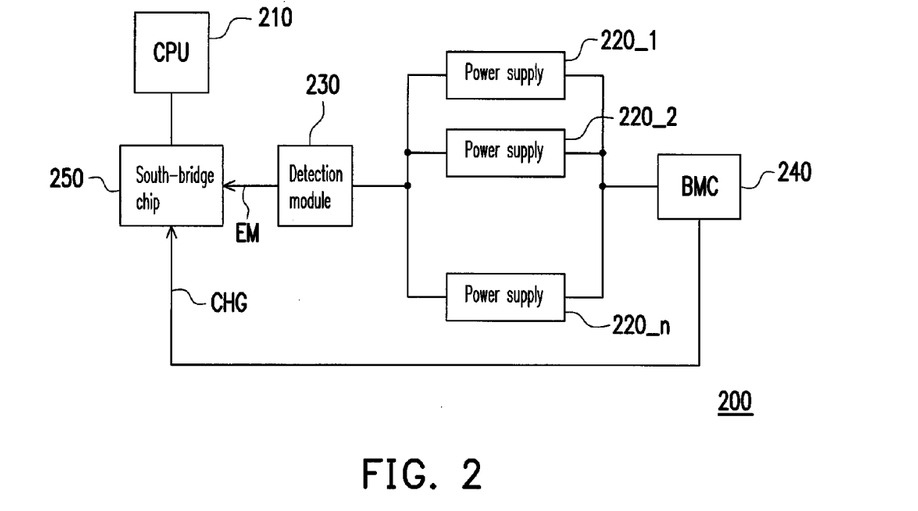
FIG. 2 is a block diagram of a computer system according to an embodiment of the present invention.

FIG. 1 is a flow chart of a power management method of a computer system according to an embodiment of the present invention. FIG. 2 is a block diagram of a computer system according to an embodiment of the present invention. Referring to FIG. 2, the computer system 200 includes a CPU 210, a plurality of power supplies 220_1 to 220_$n$, a detection module 230, a BMC 240, and a south-bridge chip 250, where n is a positive integer larger than 1. The coupling relations between the CPU 210, the power supplies 220_1 to 220_$n$, the detection module 230, the BMC 240, and the south-bridge chip 250 are as shown in FIG. 2, so the details thereof are not described herein.

Referring to FIGS. 1 and 2, in Step S110, health states of the plurality of power supplies 220_1 to 220_$n$ are detected to generate a detection signal. That is, the detection module 230 detects whether the power supplies 220_1 to 220_$n$ can provide power normally. For example, if it is detected that the power supplies 220_1 to 220_$n$ are all in a healthy state, each of the power supplies 220_1 to 220_$n$ is capable of providing a maximum rated power, for example, 150 W, and the detection module 230 disables the detection signal to the south-bridge chip 250 (for example, to an EM pin of the south-bridge chip 250).

If it is detected that at least one of the power supplies 220_1 to 220_$n$ is in an unhealthy state (for example, the power supply 220_1), the power supply 220_1 fails or is damaged, for example, the power supply 220_1 can only provide a power in partial proportion to the rated power (for example, 100 W) due to the failure of its heatsink fan, or the power supply 220_1 completely fails and cannot provide any power, so that the detection module 230 enables the detection signal to the south-bridge chip 250 (for example, to the EM pin of the south-bridge chip 250).

Next, in Step S120, an interrupt is generated by a configuration management program according to the detection signal (for example, including information that at least one of the power supplies 220_1 to 220_$n$ is in an unhealthy state). That is, when the EM pin of the south-bridge chip 250 receives the detection signal enabled by the detection module 230, the south-bridge chip 250 accordingly triggers the configuration management program to generate the interrupt.

Afterward, in Step S130, the interrupt is processed by an interrupt handler to adjust a power consumption of the CPU 210. That is, the interrupt handler adjusts a working frequency, a duty cycle, and a number of threads of the CPU 210 to adapt for the current power consumption that can be provided by the power supplies according to the information that the power supply is in an unhealthy state (that is, the interrupt). In this manner, according to this embodiment, when at least one of the power supplies 220_1 to 220_$n$ is in an unhealthy state, the computer system 200 can still work safely with the optimal performance.

In another aspect, in Step S140, the output powers provided by the power supplies 220_1 to 220_$n$ are received to calculate a total maximum output power of the power supplies 220_1 to 220_$n$. For example, the BMC 240 polls each of the power supplies 220_1 to 220_$n$ through a SMBus or a PMBus and receives the output powers provided thereby, to add up the output powers of the power supplies 220_1 to 220_$n$ to obtain the total maximum output power, and accordingly transmit a signal to the south-bridge chip 250 (for example, to a CHG pin of the south-bridge chip 250).

For ease of illustration, it is assumed that seven power supplies are provided in this embodiment, that is, the power supplies 220_1 to 220_7, and the present invention is not limited thereto. For example, it is assumed that the BMC 240 determines that three power supplies (for example, the power supplies 220_1 to 220_3) are in a healthy state and the other four power supplies (for example, the power supplies 220_4 to 220_7) are in an unhealthy state (for instance, three of them can only provide a power in partial proportion to the rated power and the rest one of them completely fails). Therefore, the output powers of the seven power supplies 220_1 to 220_7 are added up as 150 W*3+100 W*3+0 W-750 W, to obtain the total maximum output power.

In Step S150, an interrupt is generated by the configuration management program according to the total maximum output power or the detection signal (that is, including the information of the total maximum output power or that at least one of the power supplies 220_1 to 220_$n$ is in an unhealthy state). That is, when the CHG pin of the south-bridge chip 250 receives a signal of the total maximum output power provided by the BMC 240, the south-bridge chip 250 accordingly triggers the configuration management program to generate the interrupt.

Next, in Step S130, the interrupt is processed by the interrupt handler to adjust the power consumption of the CPU.

That is, the interrupt handler adjusts the working frequency, the duty cycle, and the number of threads of the CPU to adapt for the power consumption of 750 W according to the information of the total maximum output power (that is, the interrupt). In this manner, the present invention is capable of predicting the output powers of the power supplies 220_1 to 220_$n$ (that is, to predict the changes of the output powers of the power supplies 220_1 to 220_$n$), to accordingly adjust the power consumption of the CPU 210.

In this embodiment, the configuration management program may be an ACPI or any other configuration management program capable of managing the internal configuration of the computer system; the interrupt may be an SMI; and the interrupt handler may be an SMI handler.

Figure 3:
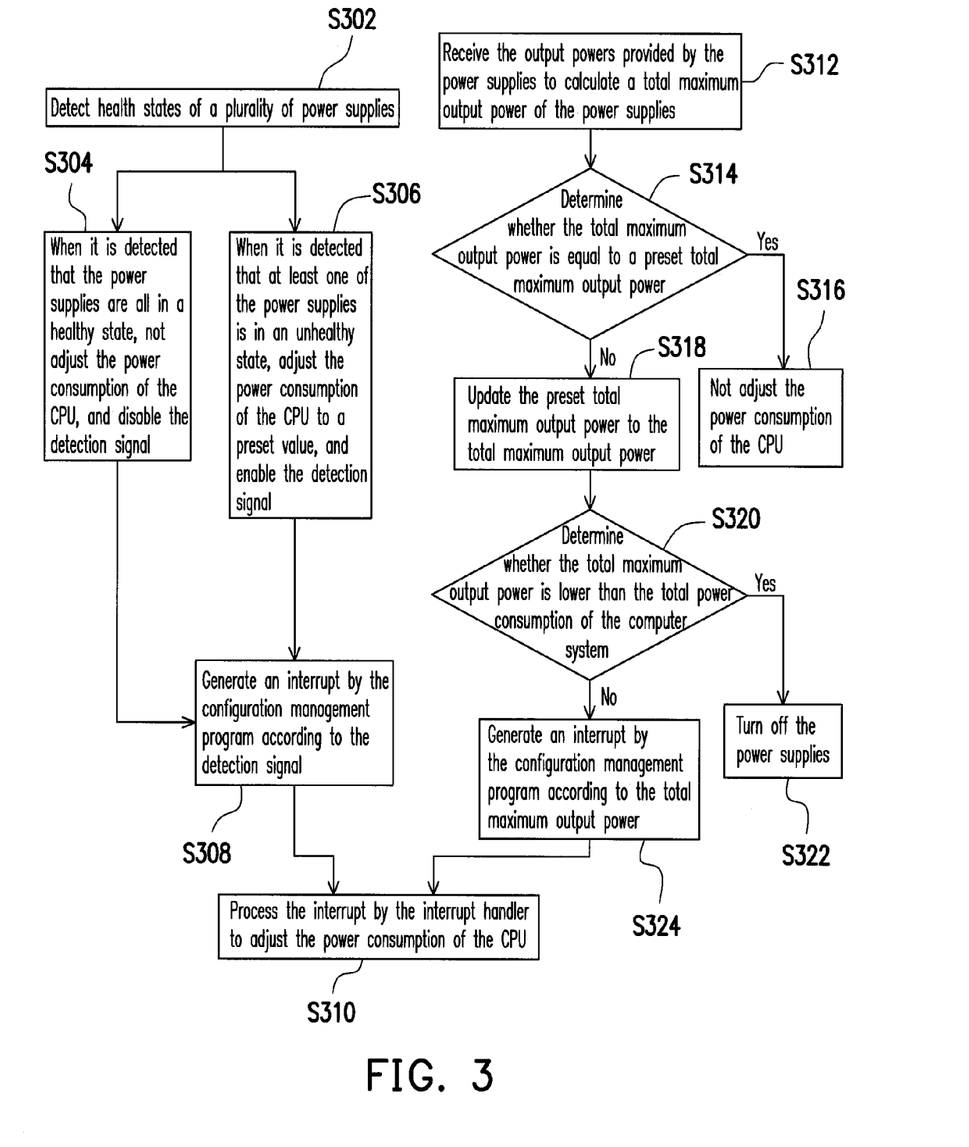
FIG. 3 is a flow chart of a power management method of a computer system according to another embodiment of the present invention.

FIG. 3 is a flow chart of a power management method of a computer system according to another embodiment of the present invention. Referring to FIGS. 2 and 3, in Step S302, health states of a plurality of power supplies 220_1 to 220_$n$ are detected. For example, the detection module 230 detects whether the power supplies 220_1 to 220_$n$ can provide power normally. In Step S304, when it is detected that the power supplies 220_1 to 220_$n$ are all in a healthy state, the power consumption of the CPU 210 is not adjusted, that is, the working frequency of the CPU 210 does not need to be lowered to reduce the overall power consumption of the computer system 100, and the detection signal is disabled, that is, the detection module 230 disables the detection signal to an EM pin of the south-bridge chip 250.

In another aspect, in Step S306, when it is detected that at least one of the power supplies 220_1 to 220_$n$ is in an unhealthy state (that is, it can only provide a part of the electric power or is damaged), the power consumption of the CPU 210 is reduced to a preset value, for example, to a lowest power consumption of the CPU 210, such that the computer system 200 can operate normally, and the detection signal is enabled, that is, the detection module 230 enables the detection signal to the EM pin of the south-bridge chip 250, and thus the computer system 200 can work normally.

Next, in Step S308, an interrupt is generated by a configuration management program according to the detection signal (for example, including information that at least one of the power supplies 220_1 to 220_$n$ is in an unhealthy state). That is, when the EM pin of the south-bridge chip 250 receives the detection signal enabled by the detection module 230, the south-bridge chip 250 accordingly triggers the configuration management program to generate the interrupt.

Afterward, in Step S310, the interrupt is processed by an interrupt handler to adjust the power consumption of the CPU 210. That is, the interrupt handler adjusts a working frequency, a duty cycle, and a number of threads of the CPU 210 to adapt for the current power consumption that can be provided by the power supplies according to the information that the power supply is in an unhealthy state (that is, the interrupt). In this manner, according to this embodiment, when at least one of the power supplies 220_1 to 220_$n$ is in an unhealthy state, the computer system 200 can still work safely with the optimal performance.

In another aspect, in Step S312, the output powers provided by the power supplies 220_1 to 220_$n$ are received to calculate a total maximum output power of the power supplies 220_1 to 220_$n$. That is, the BMC 240 polls each of the power supplies 220_1 to 220_$n$ through a SMBus or a PMBus and receives the output powers provided thereby, to add up the output powers of the power supplies 220_1 to 220_$n$ capable of providing power to obtain the total maximum output power. In Step S314, it is determined whether the total maximum output power is equal to a preset maximum output power. That is, the BMC 240 stores the total maximum output power (that is, the preset total maximum output power) originally provided by the power supplies 220_1 to 220_$n$. When receiving and calculating the maximum output power and the total maximum output power that can be provided by the power supplies 220_1 to 220_$n$ currently, the BMC 240 compares the preset total maximum output power with the total maximum output power, to ensure the current power supply state of the power supplies 220_1 to 220_$n$.

Next, if it is determined that the total maximum output power (for example, 800 W) is equal to the preset total maximum output power (for example, 800 W), Step S316 is performed, and the power consumption of the CPU 210 is not adjusted. In another aspect, if it is determined that the total maximum output power (for example, 750 W) is not equal to the preset total maximum output power (for example, 800 W), Step S318 is performed, and the preset total maximum output power is updated from 800 W to the total maximum output power of 750 W, to serve as a reference for determining the power supply state of the power supplies 220_1 to 220_$n$ the next time.

Afterward, in Step S320, it is determined whether the total maximum output power is lower than the total power consumption of the computer system 200. If it is determined that the total maximum output power is lower than the total power consumption of the computer system 200, the power provided by the power supplies 220_1 to 220_$n$ is insufficient to maintain the normal working of the computer system 200, and Step S322 is performed, so that the power supplies 220_1 to 220_$n$ are turned off, and the computer system 200 is shut down.

In another aspect, if it is determined that the total maximum output power is not lower than the total power consumption of the computer system 200, Step S324 is performed, and an interrupt is generated by the configuration management program according to the total maximum output power. In Step S310, the interrupt is processed by the interrupt handler to adjust the power consumption of the CPU 210, that is, the working frequency of the CPU 210 is adjusted to adapt for the total maximum output power. In this manner, the present invention is capable of predicting the output powers of the power supplies 220_1 to 220_$n$ (that is, to predict the changes of the output powers of the power supplies 220_1 to 220_$n$), to accordingly adjust the power consumption of the CPU 210.

In this embodiment, the adjustment of the power consumption of the CPU 210 includes adjusting the working frequency, the duty cycle, and the number of threads of the CPU 210. That is, the computer system 200 can lower the working frequency (that is, the performance), the duty cycle (that is, the throttling state), and the number of threads of the CPU 210, to reduce the power consumption of the computer system 200.

Further, the power consumption of the CPU 210 is adjusted in a table look-up manner. That is, the interrupt handler obtains the information of the total maximum output power of the power supplies 220_1 to 220_$n$ or detects the detection signal provided by the detection module 230 through the BMC 240, then finds the working frequency, the duty cycle, and the number of threads of the CPU 210 to be adjusted from a basic input/output system read-only memory (BIOS ROM) in the table look-up manner according to the total maximum output power or the detection signal, and stores the obtained information in a system management random access memory (SMRAM).

Afterward, the number of threads of the CPU 210 to be turned off is informed to the operating system, and the operating system decides which threads will be turned off. The operating system moves away the software on the thread, stores an advanced programmable interrupt controller ID (APIC ID) of the thread in a variable collection of a BIOS ACPI Machine Language (AML), and transmits the APIC ID into the interrupt handler. Thus, the interrupt handler obtains through the SMRAM the duty cycle and the working frequency of the CPU 210 and the APIC IDs of the threads of the CPU 210 to be adjusted.

Next, the duty cycle and the working frequency of the CPU 210 are set according to the above information, and the threads of the CPU 210 are turned off according to the APIC IDs, to reduce the power consumption of the CPU 210, such that the computer system can still work safely with the optimal performance. A register of the CPU 210 (for example, a model-specific register (MSR)) may be arranged to set the duty cycle and the working frequency of the CPU 210 and turn off the threads of specific APIC IDs.

Hereinafter, some examples are given to illustrate the method of reducing the power consumption of the CPU 210. It is assumed that the computer system has one CPU, the CPU has four cores and each core has two threads, the CPU has an internal frequency of 2.66 GHz and an external frequency of 133 MHz, the computer system has a maximum system power consumption of 750 W, and the power supply has a maximum output power of 750 W (assuming that five power supplies are present, which respectively provide a power of 230 W, 140 W, 130 W, 130 W, and 120 W).

Table 1 is a comparison table of the number of threads of the CPU to be turned off and the maximum system power consumption. Tables 2 to 9 are respectively comparison tables of the duty cycle, the working frequency, and the adjusted power consumption when zero to seven threads of the CPU are turned off. The data in Tables 1 to 9 is, for example, stored in a BIOS ROM. When one power supply is in an unhealthy state (for example, the power supply that provides the power of 230 W is damaged and cannot provide any power), the power consumption of the CPU in the computer system is first adjusted to the lowest level. In this case, the interrupt handler finds from the BIOS ROM the number of threads of the CPU to be turned off and the appropriate duty cycle and working frequency of the CPU according to the interrupt.

In another aspect, the BMC calculates the total maximum output power of the power supplies (that is, 140 W+130 W+130 W+120 W=520 W), an interrupt is generated by the configuration management program according to the total maximum output power (520 W). Thus, the interrupt handler finds from the BIOS ROM the number of threads of the CPU to be turned off and the appropriate duty cycle and working frequency of the CPU according to the interrupt.

That is to say, the interrupt handler starts searching from turning off zero thread of the CPU in Table 1, and then enters Table 2 to find the appropriate working frequency and duty cycle of the CPU, so as to find a proper adjusted value. If no proper adjusted value can be found in Table 2 where no thread of the CPU is turned off, Table 3 where one thread of the CPU is turned off, Table 4 where two threads of the CPU are turned off, . . . , and Table 9 where seven threads of the CPU are turned off are sequentially searched to find the proper adjusted value.

For example, when the interrupt handler finds the proper adjusted value from Table 3 where one thread of the CPU is turned off (for example, one thread of the CPU is turned off, the duty cycle of the CPU is T1, and the working frequency of the CPU is P2, which is represented by 1 thread: T1:P2), the interrupt handler stores the data in the SMRAM. Next, the number of threads of the CPU to be turned off, that is, 1, is informed to the operating system (that is, one thread is to be removed), and the operating system decides which thread (for example, the APIC ID 1) will be turned off. The operating system moves away the software on the APIC ID 1, stores the APIC ID 1 in the variable collection of the BIOS AML, and transmits the APIC ID 1 to the interrupt handler. Thereby, the interrupt handler obtains the APIC ID 1: T1:P2 from the SMRAM. A register of the CPU 210 (for example, an MSR) may be arranged to set the duty cycle and the working frequency of the CPU 210 and turn off the thread corresponding to the APIC ID 1.

Afterward, the duty cycle (87.5%) and the working frequency (2.66 GHz−2*133 MHz=2.394 GHz) of the CPU are set according to the above information, and one thread of the CPU is turned off according to the APIC ID 1, so as to adjust the overall power consumption of the computer system to 0.875*0.9*656.25 W (which is approximately 516.8 W). Since the adjusted overall power consumption of the computer system and the total maximum power consumption of the power supplies (520 W) are close, in this embodiment, when at least one of the power supplies fails, the computer system can still work safely with the optimal performance. Further, the present invention is capable of predicting the output powers of the power supplies (that is, to predict the changes of the output powers of the power supplies), to accordingly adjust the power consumption of the CPU.

TABLE 1

Comparison table of the number of threads of the CPU to be turned off and the maximum system power consumption

| Number of threads of the CPU to be turned off | Order | Maximum system power consumption |
|---|---|---|
| 0 | 1 | Table 2 |
| 1 | 2 | Table 3 |
| 2 | 3 | Table 4 |
| 3 | 4 | Table 5 |
| 4 | 5 | Table 6 |
| 5 | 6 | Table 7 |
| 6 | 7 | Table 8 |
| 7 | 8 | Table 9 |
| 8 | NA | NA |

TABLE 2

Comparison table of the duty cycle, the working frequency, and the Maximum system power consumption when 0 thread of the CPU is turned off

| Duty cycle (Tx) (Tx: the larger the value of x is, the longer the duty cycle of the CPU is, and x = 0 represents that the duty cycle of the CPU is 100%) | Working frequency (Pn) (Pn: the larger the value of n is, the greater the internal frequency of the CPU is, and n = 0 represents that the CPU operates with the highest internal frequency) for example: the maximum frequency of the CPU = 2.66 GHz, and the external frequency of the CPU = 133 MHz Pn is reduced by a performance of n * (133M/2.66G) = n * (1/20) = 5 * n %, and thus the power is lowered by 5 * n % | Maximum system power consumption The power required by Tx/Pn is: (1 − x * 12.5%) * (1 − n * 5%) * 750 W |
|---|---|---|
| T0: Duty cycle = 100% | P0 - max frequency | T0/P0 - 1 * 1 * 750 W |
| | P1 - max - 133M | T0/P1 - 1 * 0.95 * 750 W |
| | P2 - max - 2 * 133M | T0/P2 - 1 * 0.9 * 750 W |
| | . . . | . . . |
| | P8 - max - 8 * 133M | T0/P8 - 1 * 0.6 * 750 W |
| T1: Duty cycle = 1 − 12.5% = 87.5% | P0 - max frequency | T1/P0 - 0.875 * 1 * 750 W |
| | P1 - max - 133M | T1/P1 - 0.875 * 0.95 * 750 W |
| | P2 - max - 2 * 133M | T1/P2 - 0.875 * 1 * 0.9 * 750 W |
| | . . . | . . . |
| | P8 - max - 8 * 133M | T1/P8 - 0.875 * 1 * 0.6 * 750 W |
| T2: Duty cycle = 1 − 2 * 12.5% = 75% | P0 - max frequency | T2/P0 - 0.75 * 1 * 750 W |
| | P1 - max - 133M | T2/P1 - 0.75 * 0.95 * 750 W |
| | P2 - max - 2 * 133M | T2/P2 - 0.75 * 0.9 * 750 W |
| | . . . | . . . |
| | P8 - max - n * 133M | T2/P8 - 0.75 * 0.6 * 750 W |
| T3: Duty cycle = 1 − 3 * 12.5% = 62.5% | P0 - max frequency | T3/P0 - 0.625 * 1 * 750 W |
| | P1 - max - 133M | T3/P1 - 0.625 * 0.95 * 750 W |
| | P2 - max - 2 * 133M | T3/P2 - 0.625 * 0.9 * 750 W |
| | . . . | . . . |
| | P8 - max - n * 133M | T3/P8 - 0.625 * 0.6 * 750 W |
| T4: Duty cycle = 1 − 4 * 12.5% = 50% | P0 - max frequency | T4/P0 - 0.5 * 1 * 750 W |
| | P1 - max - 133M | T4/P1 - 0.5 * 0.95 * 750 W |
| | P2 - max - 2 * 133M | T4/P2 - 0.5 * 0.9 * 750 W |
| | . . . | . . . |
| | P8 - max - n * 133M | T4/P8 - 0.5 * 0.6 * 750 W |
| T5: Duty cycle = 1 − 5 * 12.5% = 37.5% | P0 - max frequency | T5/P0 - 0.375 * 1 * 750 W |
| | P1 - max - 133M | T5/P1 - 0.375 * 0.95 * 750 W |
| | P2 - max - 2 * 133M | T5/P2 - 0.375 * 0.9 * 750 W |
| | . . . | . . . |
| | P8 - max - n * 133M | T5/P8 - 0.375 * 0.6 * 750 W |
| T6: Duty cycle = 1 − 6 * 12.5% = 25% | P0 - max frequency | T6/P0 - 0.25 * 1 * 750 W |
| | P1 - max - 133M | T6/P1 - 0.25 * 0.95 * 750 W |
| | P2 - max - 2 * 133M | T6/P2 - 0.25 * 0.9 * 750 W |
| | . . . | . . . |
| | P8 - max - n * 133M | T6/P8 - 0.25 * 0.6 * 750 W |
| T7: Duty cycle = 1 − 7 * 12.5% = 12.5% | P0 - max frequency | T7/P0 - 0.125 * 1 * 750 W |
| | P1 - max - 133M | T7/P1 - 0.125 * 0.95 * 750 W |
| | P2 - max - 2 * 133M | T7/P2 - 0.125 * 0.9 * 750 W |
| | . . . | . . . |
| | P8 - max - n * 133M | T7/P8 - 0.125 * 0.6 * 750 W |

TABLE 3

Comparison table of the duty cycle, the working frequency, and the Maximum system power consumption when 1 thread of the CPU is turned off

| Tx | Pn | Maximum system power consumption<br>The power required by Tx/Pn is:<br>$(1 - x * 12.5\%) * (1 - n * 5\%)$<br>$(7/8) * 750$ W |
|---|---|---|
| T0:<br>Duty cycle = 100% | P0 - max frequency<br>P1 - max - 133M<br>P2 - max - 2 * 133M<br>...<br>P8 - max - 8 * 133M | T0/P0 - 1 * 1 * 656.25 W<br>T0/P1 - 1 * 0.95 * 656.25 W<br>T0/P2 - 1 * 0.9 * 656.25 W<br>...<br>T0/P8 - 1 * 0.6 * 656.25 W |
| T1:<br>Duty cycle = 1 - 12.5% = 87.5% | P0 - max frequency<br>P1 - max - 133M<br>P2 - max - 2 * 133M<br>...<br>P8 - max - 8 * 133M | T1/P0 - 0.875 * 1 * 656.25 W<br>T1/P1 - 0.875 * 0.95 * 656.25 W<br>T1/P2 - 0.875 * 1 * 0.9 * 656.25 W<br>...<br>T1/P8 - 0.875 * 1 * 0.6 * 656.25 W |
| T2:<br>Duty cycle = 1 - 2 * 12.5% = 75% | P0 - max frequency<br>P1 - max - 133M<br>P2 - max - 2 * 133M<br>...<br>P8 - max - n * 133M | T2/P0 - 0.75 * 1 * 656.25 W<br>T2/P1 - 0.75 * 0.95 * 656.25 W<br>T2/P2 - 0.75 * 0.9 * 656.25 W<br>...<br>T2/P8 - 0.75 * 0.6 * 656.25 W |
| T3:<br>Duty cycle = 1 - 3 * 12.5% = 62.5% | P0 - max frequency<br>P1 - max - 133M<br>P2 - max - 2 * 133M<br>...<br>P8 - max - n * 133M | T3/P0 - 0.625 * 1 * 656.25 W<br>T3/P1 - 0.625 * 0.95 * 656.25 W<br>T3/P2 - 0.625 * 0.9 * 656.25 W<br>...<br>T3/P8 - 0.625 * 0.6 * 656.25 W |
| T4:<br>Duty cycle = 1 - 4 * 12.5% = 50% | P0 - max frequency<br>P1 - max - 133M<br>P2 - max - 2 * 133M<br>...<br>P8 - max - n * 133M | T4/P0 - 0.5 * 1 * 656.25 W<br>T4/P1 - 0.5 * 0.95 * 656.25 W<br>T4/P2 - 0.5 * 0.9 * 656.25 W<br>...<br>T4/P8 - 0.5 * 0.6 * 656.25 W |
| T5:<br>Duty cycle = 1 - 5 * 12.5% = 37.5% | P0 - max frequency<br>P1 - max - 133M<br>P2 - max - 2 * 133M<br>...<br>P8 - max - n * 133M | T5/P0 - 0.375 * 1 * 656.25 W<br>T5/P1 - 0.375 * 0.95 * 656.25 W<br>T5/P2 - 0.375 * 0.9 * 656.25 W<br>...<br>T5/P8 - 0.375 * 0.6 * 656.25 W |
| T6:<br>Duty cycle = 1 - 6 * 12.5% = 25% | P0 - max frequency<br>P1 - max - 133M<br>P2 - max - 2 * 133M<br>...<br>P8 - max - n * 133M | T6/P0 - 0.25 * 1 * 656.25 W<br>T6/P1 - 0.25 * 0.95 * 656.25 W<br>T6/P2 - 0.25 * 0.9 * 656.25 W<br>...<br>T6/P8 - 0.25 * 0.6 * 656.25 W |
| T7:<br>Duty cycle = 1 - 7 * 12.5% = 12.5% | P0 - max frequency<br>P1 - max - 133M<br>P2 - max - 2 * 133M<br>...<br>P8 - max - n * 133M | T7/P0 - 0.125 * 1 * 656.25 W<br>T7/P1 - 0.125 * 0.95 * 656.25 W<br>T7/P2 - 0.125 * 0.9 * 656.25 W<br>...<br>T7/P8 - 0.125 * 0.6 * 656.25 W |

TABLE 4

Comparison table of the duty cycle, the working frequency, and the Maximum system power consumption when 2 threads of the CPU are turned off

| Tx | Pn | Maximum system power consumption<br>$(6/8) * 750$ W = 562.5 W PSU)<br>The power required by Tx/Pn is:<br>$(1 - x * 12.5\%) * (1 - n * 5\%)$<br>$(6/8) * 750$ W |
|---|---|---|
| T0:<br>Duty cycle = 100% | P0 - max frequency<br>P1 - max - 133M<br>P2 - max - 2 * 133M<br>...<br>P8 - max - 8 * 133M | T0/P0 - 1 * 1 * 562.5 W<br>T0/P1 - 1 * 0.95 * 562.5 W<br>T0/P2 - 1 * 0.9 * 562.5 W<br>...<br>T0/P8 - 1 * 0.6 * 562.5 W |
| T1:<br>Duty cycle = 1 - 12.5% = 87.5% | P0 - max frequency<br>P1 - max - 133M<br>P2 - max - 2 * 133M<br>...<br>P8 - max - 8 * 133M | T1/P0 - 0.875 * 1 * 562.5 W<br>T1/P1 - 0.875 * 0.95 * 562.5 W<br>T1/P2 - 0.875 * 1 * 0.9 * 562.5 W<br>...<br>T1/P8 - 0.875 * 1 * 0.6 * 562.5 W |
| T2:<br>Duty cycle = 1 - 2 * 12.5% = 75% | P0 - max frequency<br>P1 - max - 133M<br>P2 - max - 2 * 133M<br>...<br>P8 - max - n * 133M | T2/P0 - 0.75 * 1 * 562.5 W<br>T2/P1 - 0.75 * 0.95 * 562.5 W<br>T2/P2 - 0.75 * 0.9 * 562.5 W<br>...<br>T2/P8 - 0.75 * 0.6 * 562.5 W |
| T3:<br>Duty cycle = 1 - 3 * 12.5% = 62.5% | P0 - max frequency<br>P1 - max - 133M<br>P2 - max - 2 * 133M<br>...<br>P8 - max - n * 133M | T3/P0 - 0.625 * 1 * 562.5 W<br>T3/P1 - 0.625 * 0.95 * 562.5 W<br>T3/P2 - 0.625 * 0.9 * 562.5 W<br>...<br>T3/P8 - 0.625 * 0.6 * 562.5 W |
| T4:<br>Duty cycle = 1 - 4 * 12.5% = 50% | P0 - max frequency<br>P1 - max - 133M<br>P2 - max - 2 * 133M<br>...<br>P8 - max - n * 133M | T4/P0 - 0.5 * 1 * 562.5 W<br>T4/P1 - 0.5 * 0.95 * 562.5 W<br>T4/P2 - 0.5 * 0.9 * 562.5 W<br>...<br>T4/P8 - 0.5 * 0.6 * 562.5 W |
| T5:<br>Duty cycle = 1 - 5 * 12.5% = 37.5% | P0 - max frequency<br>P1 - max - 133M<br>P2 - max - 2 * 133M<br>...<br>P8 - max - n * 133M | T5/P0 - 0.375 * 1 * 562.5 W<br>T5/P1 - 0.375 * 0.95 * 562.5 W<br>T5/P2 - 0.375 * 0.9 * 562.5 W<br>...<br>T5/P8 - 0.375 * 0.6 * 562.5 W |
| T6:<br>Duty cycle = 1 - 6 * 12.5% = 25% | P0 - max frequency<br>P1 - max - 133M<br>P2 - max - 2 * 133M<br>...<br>P8 - max - n * 133M | T6/P0 - 0.25 * 1 * 562.5 W<br>T6/P1 - 0.25 * 0.95 * 562.5 W<br>T6/P2 - 0.25 * 0.9 * 562.5 W<br>...<br>T6/P8 - 0.25 * 0.6 * 562.5 W |
| T7:<br>Duty cycle = 1 - 7 * 12.5% = 12.5% | P0 - max frequency<br>P1 - max - 133M<br>P2 - max - 2 * 133M<br>...<br>P8 - max - n * 133M | T7/P0 - 0.125 * 1 * 562.5 W<br>T7/P1 - 0.125 * 0.95 * 562.5 W<br>T7/P2 - 0.125 * 0.9 * 562.5 W<br>...<br>T7/P8 - 0.125 * 0.6 * 562.5 W |

TABLE 5

Comparison table of the duty cycle, the working frequency, and the Maximum system power consumption when 3 threads of the CPU are turned off

| Tx | Pn | Maximum system power consumption<br>The power required by Tx/Pn is:<br>$(1 - x * 12.5\%) * (1 - n * 5\%) *$<br>$(5/8) * 750$ W |
|---|---|---|
| T0:<br>Duty cycle = 100% | P0 - max frequency<br>P1 - max - 133M<br>P2 - max - 2 * 133M<br>...<br>P8 - max - 8 * 133M | T0/P0 - 1 * 1 * 468.75 W<br>T0/P1 - 1 * 0.95 * 468.75 W<br>T0/P2 - 1 * 0.9 * 468.75 W<br>...<br>T0/P8 - 1 * 0.6 * 468.75 W |
| T1:<br>Duty cycle = 1 - 12.5% = 87.5% | P0 - max frequency<br>P1 - max - 133M<br>P2 - max - 2 * 133M<br>...<br>P8 - max - 8 * 133M | T1/P0 - 0.875 * 1 * 468.75 W<br>T1/P1 - 0.875 * 0.95 * 468.75 W<br>T1/P2 - 0.875 * 1 * 0.9 * 468.75 W<br>...<br>T1/P8 - 0.875 * 1 * 0.6 * 468.75 W |
| T2:<br>Duty cycle = 1 - 2 * 12.5% = 75% | P0 - max frequency<br>P1 - max - 133M<br>P2 - max - 2 * 133M<br>...<br>P8 - max - n * 133M | T2/P0 - 0.75 * 1 * 468.75 W<br>T2/P1 - 0.75 * 0.95 * 468.75 W<br>T2/P2 - 0.75 * 0.9 * 468.75 W<br>...<br>T2/P8 - 0.75 * 0.6 * 468.75 W |
| T3: | P0 - max frequency | T3/P0 - 0.625 * 1 * 468.75 W |

TABLE 5-continued

Comparison table of the duty cycle, the working frequency, and the Maximum system power consumption when 3 threads of the CPU are turned off

| Tx | Pn | Maximum system power consumption The power required by Tx/Pn is: $(1 - x * 12.5\%) * (1 - n * 5\%) * (5/8) * 750$ W |
|---|---|---|
| Duty cycle = 1 − 3 * 12.5% = 62.5% | P1 - max - 133M P2 - max - 2 * 133M ... P8 - max - n * 133M | T3/P1 - 0.625 * 0.95 * 468.75 W T3/P2 - 0.625 * 0.9 * 468.75 W ... T3/P8 - 0.625 * 0.6 * 468.75 W |
| T4: Duty cycle = 1 − 4 * 12.5% = 50% | P0 - max frequency P1 - max - 133M P2 - max - 2 * 133M ... P8 - max - n * 133M | T4/P0 - 0.5 * 1 * 468.75 W T4/P1 - 0.5 * 0.95 * 468.75 W T4/P2 - 0.5 * 0.9 * 468.75 W ... T4/P8 - 0.5 * 0.6 * 468.75 W |
| T5: Duty cycle = 1 − 5 * 12.5% = 37.5% | P0 - max frequency P1 - max - 133M P2 - max - 2 * 133M ... P8 - max - n * 133M | T5/P0 - 0.375 * 1 * 468.75 W T5/P1 - 0.375 * 0.95 * 468.75 W T5/P2 - 0.375 * 0.9 * 468.75 W ... T5/P8 - 0.375 * 0.6 * 468.75 W |
| T6: Duty cycle = 1 − 6 * 12.5% = 25% | P0 - max frequency P1 - max - 133M P2 - max - 2 * 133M ... P8 - max - n * 133M | T6/P0 - 0.25 * 1 * 468.75 W T6/P1 - 0.25 * 0.95 * 468.75 W T6/P2 - 0.25 * 0.9 * 468.75 W ... T6/P8 - 0.25 * 0.6 * 468.75 W |
| T7: Duty cycle = 1 − 7 * 12.5% = 12.5% | P0 - max frequency P1 - max - 133M P2 - max - 2 * 133M ... P8 - max - n * 133M | T7/P0 - 0.125 * 1 * 468.75 W T7/P1 - 0.125 * 0.95 * 468.75 W T7/P2 - 0.125 * 0.9 * 468.75 W ... T7/P8 - 0.125 * 0.6 * 468.75 W |

TABLE 6

Comparison table of the duty cycle, the working frequency, and the Maximum system power consumption when 4 threads of the CPU are turned off

| Tx | Pn | Maximum system power consumption The power required by Tx/Pn is: $(1 - x * 12.5\%) * (1 - n * 5\%) * (4/8) * 750$ W |
|---|---|---|
| T0: Duty cycle = 100% | P0 - max frequency P1 - max - 133M P2 - max - 2 * 133M ... P8 - max - 8 * 133M | T0/P0 - 1 * 1 * 375 W T0/P1 - 1 * 0.95 * 375 W T0/P2 - 1 * 0.9 * 375 W ... T0/P8 - 1 * 0.6 * 375 W |
| T1: Duty cycle = 1 − 12.5% = 87.5% | P0 - max frequency P1 - max - 133M P2 - max - 2 * 133M ... P8 - max - 8 * 133M | T1/P0 - 0.875 * 1 * 375 W T1/P1 - 0.875 * 0.95 * 375 W T1/P2 - 0.875 * 1 * 0.9 * 375 W ... T1/P8 - 0.875 * 1 * 0.6 * 375 W |
| T2: Duty cycle = 1 − 2 * 12.5% = 75% | P0 - max frequency P1 - max - 133M P2 - max - 2 * 133M ... P8 - max - n * 133M | T2/P0 - 0.75 * 1 * 375 W T2/P1 - 0.75 * 0.95 * 375 W T2/P2 - 0.75 * 0.9 * 375 W ... T2/P8 - 0.75 * 0.6 * 375 W |
| T3: Duty cycle = 1 − 3 * 12.5% = 62.5% | P0 - max frequency P1 - max - 133M P2 - max - 2 * 133M ... P8 - max - n * 133M | T3/P0 - 0.625 * 1 * 375 W T0/P1 - 0.625 * 0.95 * 375 W T3/P2 - 0.625 * 0.9 * 375 W ... T3/P8 - 0.625 * 0.6 * 375 W |
| T4: Duty cycle = 1 − 4 * 12.5% = 50% | P0 - max frequency P1 - max - 133M P2 - max - 2 * 133M ... P8 - max - n * 133M | T4/P0 - 0.5 * 1 * 375 W T4/P1 - 0.5 * 0.95 * 375 W T4/P2 - 0.5 * 0.9 * 375 W ... T4/P8 - 0.5 * 0.6 * 375 W |
| T5: Duty cycle = 1 − 5 * 12.5% = 37.5% | P0 - max frequency P1 - max - 133M P2 - max - 2 * 133M ... P8 - max - n * 133M | T5/P0 - 0.375 * 1 * 375 W T5/P1 - 0.375 * 0.95 * 375 W T5/P2 - 0.375 * 0.9 * 375 W ... T5/P8 - 0.375 * 0.6 * 375 W |
| T6: Duty cycle = 1 − 6 * 12.5% = 25% | P0 - max frequency P1 - max - 133M P2 - max - 2 * 133M ... P8 - max - n * 133M | T6/P0 - 0.25 * 1 * 375 W T6/P1 - 0.25 * 0.95 * 375 W T6/P2 - 0.25 * 0.9 * 375 W ... T6/P8 - 0.25 * 0.6 * 375 W |
| T7: Duty cycle = 1 − 7 * 12.5% = 12.5% | P0 - max frequency P1 - max - 133M P2 - max - 2 * 133M ... P8 - max - n * 133M | T7/P0 - 0.125 * 1 * 375 W T7/P1 - 0.125 * 0.95 * 375 W T7/P2 - 0.125 * 0.9 * 375 W ... T7/P8 - 0.125 * 0.6 * 375 W |

TABLE 7

Comparison table of the duty cycle, the working frequency, and the Maximum system power consumption when 5 threads of the CPU are turned off

| Tx | Pn | Maximum system power consumption The power required by Tx/Pn is: $(1 - x * 12.5\%) * (1 - n * 5\%) * (3/8) * 750$ W |
|---|---|---|
| T0: Duty cycle = 100% | P0 - max frequency P1 - max - 133M P2 - max - 2 * 133M ... P8 - max - 8 * 133M | T0/P0 - 1 * 1 * 281.25 W T0/P1 - 1 * 0.95 * 281.25 W T0/P2 - 1 * 0.9 * 281.25 W ... T0/P8 - 1 * 0.6 * 281.25 W |
| T1: Duty cycle = 1 − 12.5% = 87.5% | P0 - max frequency P1 - max - 133M P2 - max - 2 * 133M ... P8 - max - 8 * 133M | T1/P0 - 0.875 * 1 * 281.25 W T1/P1 - 0.875 * 0.95 * 281.25 W T1/P2 - 0.875 * 1 * 0.9 * 281.25 W ... T1/P8 - 0.875 * 1 * 0.6 * 281.25 W |
| T2: Duty cycle = 1 − 2 * 12.5% = 75% | P0 - max frequency P1 - max - 133M P2 - max - 2 * 133M ... P8 - max - n * 133M | T2/P0 - 0.75 * 1 * 281.25 W T2/P1 - 0.75 * 0.95 * 281.25 W T2/P2 - 0.75 * 0.9 * 281.25 W ... T2/P8 - 0.75 * 0.6 * 281.25 W |
| T3: Duty cycle = 1 − 3 * 12.5% = 62.5% | P0 - max frequency P1 - max - 133M P2 - max - 2 * 133M ... P8 - max - n * 133M | T3/P0 - 0.625 * 1 * 281.25 W T3/P1 - 0.625 * 0.95 * 281.25 W T3/P2 - 0.625 * 0.9 * 281.25 W ... T3/P8 - 0.625 * 0.6 * 281.25 W |
| T4: Duty cycle = 1 − 4 * 12.5% = 50% | P0 - max frequency P1 - max - 133M P2 - max - 2 * 133M ... P8 - max - n * 133M | T4/P0 - 0.5 * 1 * 281.25 W T4/P1 - 0.5 * 0.95 * 281.25 W T4/P2 - 0.5 * 0.9 * 281.25 W ... T4/P8 - 0.5 * 0.6 * 281.25 W |
| T5: Duty cycle = 1 − 5 * 12.5% = 37.5% | P0 - max frequency P1 - max - 133M P2 - max - 2 * 133M ... P8 - max - n * 133M | T5/P0 - 0.375 * 1 * 281.25 W T5/P1 - 0.375 * 0.95 * 281.25 W T5/P2 - 0.375 * 0.9 * 281.25 W ... T5/P8 - 0.375 * 0.6 * 281.25 W |
| T6: Duty cycle = 1 − 6 * 12.5% = 25% | P0 - max frequency P1 - max - 133M P2 - max - 2 * 133M ... P8 - max - n * 133M | T6/P0 - 0.25 * 1 * 281.25 W T6/P1 - 0.25 * 0.95 * 281.25 W T6/P2 - 0.25 * 0.9 * 281.25 W ... T6/P8 - 0.25 * 0.6 * 281.25 W |
| T7: Duty cycle = 1 − 7 * 12.5% = 12.5% | P0 - max frequency P1 - max - 133M P2 - max - 2 * 133M ... P8 - max - n * 133M | T7/P0 - 0.125 * 1 * 281.25 W T7/P1 - 0.125 * 0.95 * 281.25 W T7/P2 - 0.125 * 0.9 * 281.25 W ... T7/P8 - 0.125 * 0.6 * 281.25 W |

TABLE 8

Comparison table of the duty cycle, the working frequency, and the Maximum system power consumption when 6 threads of the CPU are turned off

| Tx | Pn | Maximum system power consumption<br>The power r required by Tx/Pn is: $(1 - x * 12.5\%) * (1 - n * 5\%) * (2/8) * 750$ W |
|---|---|---|
| T0: Duty cycle = 100% | P0 - max frequency<br>P1 - max - 133M<br>P2 - max - 2 * 133M<br>...<br>P8 - max - 8 * 133M | T0/P0 - 1 * 1 * 187.5 W<br>T0/P1 - 1 * 0.95 * 187.5 W<br>T0/P2 - 1 * 0.9 * 187.5 W<br>...<br>T0/P8 - 1 * 0.6 * 187.5 W |
| T1: Duty cycle = 1 - 12.5% = 87.5% | P0 - max frequency<br>P1 - max - 133M<br>P2 - max - 2 * 133M<br>...<br>P8 - max - 8 * 133M | T1/P0 - 0.875 * 1 * 187.5 W<br>T1/P1 - 0.875 * 0.95 * 187.5 W<br>T1/P2 - 0.875 * 1 * 0.9 * 187.5 W<br>...<br>T1/P8 - 0.875 * 1 * 0.6 * 187.5 W |
| T2: Duty cycle = 1 - 2 * 12.5% = 75% | P0 - max frequency<br>P1 - max - 133M<br>P2 - max - 2 * 133M<br>...<br>P8 - max - n * 133M | T2/P0 - 0.75 * 1 * 187.5 W<br>T2/P1 - 0.75 * 0.95 * 187.5 W<br>T2/P2 - 0.75 * 0.9 * 187.5 W<br>...<br>T2/P8 - 0.75 * 0.6 * 187.5 W |
| T3: Duty cycle = 1 - 3 * 12.5% = 62.5% | P0 - max frequency<br>P1 - max - 133M<br>P2 - max - 2 * 133M<br>...<br>P8 - max - n * 133M | T3/P0 - 0.625 * 1 * 187.5 W<br>T3/P1 - 0.625 * 0.95 * 187.5 W<br>T3/P2 - 0.625 * 0.9 * 187.5 W<br>...<br>T3/P8 - 0.625 * 0.6 * 187.5 W |
| T4: Duty cycle = 1 - 4 * 12.5% = 50% | P0 - max frequency<br>P1 - max - 133M<br>P2 - max - 2 * 133M<br>...<br>P8 - max - n * 133M | T4/P0 - 0.5 * 1 * 187.5 W<br>T4/P1 - 0.5 * 0.95 * 187.5 W<br>T4/P2 - 0.5 * 0.9 * 187.5 W<br>...<br>T4/P8 - 0.5 * 0.6 * 187.5 W |
| T5: Duty cycle = 1 - 5 * 12.5% = 37.5% | P0 - max frequency<br>P1 - max - 133M<br>P2 - max - 2 * 133M<br>...<br>P8 - max - n * 133M | T5/P0 - 0.375 * 1 * 187.5 W<br>T5/P1 - 0.375 * 0.95 * 187.5 W<br>T5/P2 - 0.375 * 0.9 * 187.5 W<br>...<br>T5/P8 - 0.375 * 0.6 * 187.5 W |
| T6: Duty cycle = 1 - 6 * 12.5% = 25% | P0 - max frequency<br>P1 - max - 133M<br>P2 - max - 2 * 133M<br>...<br>P8 - max - n * 133M | T6/P0 - 0.25 * 1 * 187.5 W<br>T6/P1 - 0.25 * 0.95 * 187.5 W<br>T6/P2 - 0.25 * 0.9 * 187.5 W<br>...<br>T6/P8 - 0.25 * 0.6 * 187.5 W |
| T7: Duty cycle = 1 - 7 * 12.5% = 12.5% | P0 - max frequency<br>P1 - max - 133M<br>P2 - max - 2 * 133M<br>...<br>P8 - max - n * 133M | T7/P0 - 0.125 * 1 * 187.5 W<br>T7/P1 - 0.125 * 0.95 * 187.5 W<br>T7/P2 - 0.125 * 0.9 * 187.5 W<br>...<br>T7/P8 - 0.125 * 0.6 * 187.5 W |

TABLE 9

Comparison table of the duty cycle, the working frequency, and the Maximum system power consumption when 7 threads of the CPU are turned off

| Tx | Pn | Maximum system power consumption<br>The power required by Tx/Pn is: $(1 - x * 12.5\%) * (1 - n * 5\%) * (1/8) * 750$ W |
|---|---|---|
| T0: Duty cycle = 100% | P0 - max frequency<br>P1 - max - 133M<br>P2 - max - 2 * 133M<br>...<br>P8 - max - 8 * 133M | T0/P0 - 1 * 1 * 93.75 W<br>T0/P1 - 1 * 0.95 * 93.75 W<br>T0/P2 - 1 * 0.9 * 93.75 W<br>...<br>T0/P8 - 1 * 0.6 * 93.75 W |
| T1: Duty cycle = 1 - 12.5% = 87.5% | P0 - max frequency<br>P1 - max - 133M<br>P2 - max - 2 * 133M<br>...<br>P8 - max - 8 * 133M | T1/P0 - 0.875 * 1 * 93.75 W<br>T1/P1 - 0.875 * 0.95 * 93.75 W<br>T1/P2 - 0.875 * 1 * 0.9 * 93.75 W<br>...<br>T1/P8 - 0.875 * 1 * 0.6 * 93.75 W |
| T2: Duty cycle = 1 - 2 * 12.5% = 75% | P0 - max frequency<br>P1 - max - 133M<br>P2 - max - 2 * 133M<br>...<br>P8 - max - n * 133M | T2/P0 - 0.75 * 1 * 93.75 W<br>T2/P1 - 0.75 * 0.95 * 93.75 W<br>T2/P2 - 0.75 * 0.9 * 93.75 W<br>...<br>T2/P8 - 0.75 * 0.6 * 93.75 W |
| T3: Duty cycle = 1 - 3 * 12.5% = 62.5% | P0 - max frequency<br>P1 - max - 133M<br>P2 - max - 2 * 133M<br>...<br>P8 - max - n * 133M | T3/P0 - 0.625 * 1 * 93.75 W<br>T3/P1 - 0.625 * 0.95 * 93.75 W<br>T3/P2 - 0.625 * 0.9 * 93.75 W<br>...<br>T3/P8 - 0.625 * 0.6 * 93.75 W |
| T4: Duty cycle = 1 - 4 * 12.5% = 50% | P0 - max frequency<br>P1 - max - 133M<br>P2 - max - 2 * 133M<br>...<br>P8 - max - n * 133M | T4/P0 - 0.5 * 1 * 93.75 W<br>T4/P1 - 0.5 * 0.95 * 93.75 W<br>T4/P2 - 0.5 * 0.9 * 93.75 W<br>...<br>T4/P8 - 0.5 * 0.6 * 93.75 W |
| T5: Duty cycle = 1 - 5 * 12.5% = 37.5% | P0 - max frequency<br>P1 - max - 133M<br>P2 - max - 2 * 133M<br>...<br>P8 - max - n * 133M | T5/P0 - 0.375 * 1 * 93.75 W<br>T5/P1 - 0.375 * 0.95 * 93.75 W<br>T5/P2 - 0.375 * 0.9 * 93.75 W<br>...<br>T5/P8 - 0.375 * 0.6 * 93.75 W |
| T6: Duty cycle = 1 - 6 * 12.5% = 25% | P0 - max frequency<br>P1 - max - 133M<br>P2 - max - 2 * 133M<br>...<br>P8 - max - n * 133M | T6/P0 - 0.25 * 1 * 93.75 W<br>T6/P1 - 0.25 * 0.95 * 93.75 W<br>T6/P2 - 0.25 * 0.9 * 93.75 W<br>...<br>T6/P8 - 0.25 * 0.6 * 93.75 W |
| T7: Duty cycle = 1 - 7 * 12.5% = 12.5% | P0 - max frequency<br>P1 - max - 133M<br>P2 - max - 2 * 133M<br>...<br>P8 - max - n * 133M | T7/P0 - 0.125 * 1 * 93.75 W<br>T7/P1 - 0.125 * 0.95 * 93.75 W<br>T7/P2 - 0.125 * 0.9 * 93.75 W<br>...<br>T7/P8 - 0.125 * 0.6 * 93.75 W |

In view of the above, according to the embodiments of the present invention, the health states of the power supplies are detected, and the output powers provided by the power supplies are received to acquire the total maximum output power of the power supplies capable of providing power. Next, the interrupt is generated by triggering the configuration management program according to the health states or the total maximum output power of the power supplies. The interrupt is then processed by the interrupt handler to adjust the working frequency, the duty cycle, and the number of threads of the CPU in a table look-up manner, so as to further adjust the power consumption of the CPU. In this manner, through the present invention, when at least one of the power supplies fails or is damaged, the computer system can still work safely with the optimal performance. Moreover, the present invention is also capable of predicting the output powers of the power supplies (that is, to predict the changes of the output powers of the power supplies), to accordingly adjust the power consumption of the CPU.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A power management method of a computer system, comprising:
   detecting health states of a plurality of power supplies to generate a detection signal;
   receiving output powers provided by the power supplies to calculate a total maximum output power of the power supplies by a baseboard management controller (BMC);

triggering a configuration management program to generate an interrupt by a south-bridge chip according to the total maximum output power or the detection signal; and processing the interrupt by an interrupt handler to adjust a power consumption of a central processing unit (CPU) according to the total maximum output power.

2. The power management method of the computer system according to claim 1, wherein the adjustment of the power consumption of the CPU comprises adjusting a duty cycle, a working frequency, and a number of threads of the CPU.

3. The power management method of the computer system according to claim 1, wherein the adjustment of the power consumption of the CPU is performed in a table look-up manner.

4. The power management method of the computer system according to claim 1, wherein after the step of receiving the output powers provided by the power supplies to calculate the total maximum output power of the power supplies, the method further comprises:

determining whether the total maximum output power is equal to a preset total maximum output power, wherein if it is determined that the total maximum output power is equal to the preset total maximum output power, the power consumption of the CPU is not adjusted;

if it is determined that the total maximum output power is not equal to the preset total maximum output power, the preset total maximum output power is updated to the total maximum output power, and it is determined whether the total maximum output power is lower than a total power consumption of the computer system;

if it is determined that the total maximum output power is lower than the total power consumption of the computer system, the power supplies are turned off; and if it is determined that the total maximum output power is greater than or equal to the total power consumption of the computer system, the step of generating the interrupt by the configuration management program according to the total maximum output power is performed.

5. The power management method of the computer system according to claim 1, wherein the step of detecting the health states of the plurality of power supplies to generate the detection signal comprises:

when it is detected that at least one of the power supplies is in an unhealthy state, adjusting the power consumption of the CPU to a preset value, enabling the detection signal, and performing the step of generating the interrupt by the configuration management program according to the detection signal; and when it is detected that the power supplies are all in a healthy state, not adjusting the power consumption of the CPU, and disabling the detection signal.

6. The power management method of the computer system according to claim 1, wherein the interrupt is a system management interrupt (SMI), and the interrupt handler is an SMI handler.

7. The power management method of the computer system according to claim 1, wherein the configuration management program is an advanced configuration and power interface (ACPI) program.

8. The power management method of the computer system according to claim 1, further comprising:

determining whether the total maximum output power is equal to a preset total maximum output power, wherein if it is determined that the total maximum output power is equal to the preset total maximum output power, the power consumption of the CPU is not adjusted;

if it is determined that the total maximum output power is not equal to the preset total maximum output power, the preset total maximum output power is updated to the total maximum output power, and it is determined whether the total maximum output power is lower than a total power consumption of the computer system;

if it is determined that the total maximum output power is lower than the total power consumption of the computer system, the power supplies are turned off; and if it is determined that the total maximum output power is greater than or equal to the total power consumption of the computer system, the step of generating the interrupt by the configuration management program according to the total maximum output power is performed, wherein the adjustment of the power consumption of the CPU comprises adjusting a duty cycle, a working frequency, and a number of threads of the CPU, the adjustment of the power consumption of the CPU is performed in a table look-up manner, and the step of detecting the health states of the plurality of power supplies to generate the detection signal comprises: when it is detected that at least one of the power supplies is in an unhealthy state, adjusting the power consumption of the CPU to a preset value, enabling the detection signal, and performing the step of generating the interrupt by the configuration management program according to the detection signal; and when it is detected that the power supplies are all in a healthy state, not adjusting the power consumption of the CPU, and disabling the detection signal.

9. A computer system, comprising:

a central processing unit (CPU);

a plurality of power supplies, for providing a plurality of output powers;

a detection circuit, coupled to the power supplies, for detecting health states of the power supplies, to generate a detection signal;

a baseboard management controller (BMC), coupled to the power supplies, for receiving the output powers, to calculate a total maximum output power of the power supplies, wherein the BMC is coupled to the power supplies through a system management bus (SMBus) or a power management bus (PMBus); and a south-bridge chip, coupled to the detection circuit and the BMC, for receiving the detection signal or the total maximum output power and accordingly triggering a configuration management program to generate an interrupt, so that the interrupt is processed by an interrupt handler to adjust a power consumption of the CPU according to the total maximum output power.

10. The computer system according to claim 9, wherein when detecting that at least one of the power supplies is in an unhealthy state, the detection circuit enables the detection signal, and thus the south-bridge chip adjusts the power consumption of the CPU to a preset value, and triggers the configuration management program to generate the interrupt, so that the interrupt is processed by the interrupt handler to adjust the power consumption of the CPU; while when detecting that the power supplies are all in a healthy state, the detection circuit disables the detection signal, and thus the power consumption of the CPU is not adjusted.

11. The computer system according to claim 9, wherein when calculating the total maximum output power, the BMC compares the total maximum output power with a preset total maximum output power, and when the total maximum output power is not equal to the preset total maximum output power, the BMC updates the preset total maximum output power to the total maximum output power, and transmits a signal of the total maximum output power to the south-bridge chip to trigger the configuration management program to generate the interrupt, so that the interrupt is processed by the interrupt handler to adjust the power consumption of the CPU.

12. The computer system according to claim 9, wherein when detecting that at least one of the power supplies is in an unhealthy state, the detection circuit enables the detection signal, and thus the south-bridge chip adjusts the power consumption of the CPU to a preset value, and triggers the configuration management program to generate the interrupt, so that the interrupt is processed by the interrupt handler to adjust the power consumption of the CPU; while when detecting that the power supplies are all in a healthy state, the detection circuit disables the detection signal, and thus the power consumption of the CPU is not adjusted; and when calculating the total maximum output power, the BMC compares the total maximum output power with a preset total maximum output power, and when the total maximum output power is not equal to the preset total maximum output power, the BMC updates the preset total maximum output power to the total maximum output power, and transmits a signal of the total maximum output power to the south-bridge chip to trigger the configuration management program to generate the interrupt, so that the interrupt is processed by the interrupt handler to adjust the power consumption of the CPU.

* * * * *